United States Patent
Takeyama et al.

(10) Patent No.: US 7,643,206 B2
(45) Date of Patent: Jan. 5, 2010

(54) OPTICAL AMPLIFIER

(75) Inventors: Tomoaki Takeyama, Kawasaki (JP);
Keiko Sasaki, Kawasaki (JP);
Shinichirou Muro, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 149 days.

(21) Appl. No.: 11/598,098

(22) Filed: Nov. 13, 2006

(65) Prior Publication Data
US 2007/0229941 A1 Oct. 4, 2007

(30) Foreign Application Priority Data
Mar. 28, 2006 (JP) .............................. 2006-088321

(51) Int. Cl.
*H04B 10/17* (2006.01)
*H04B 10/12* (2006.01)
(52) U.S. Cl. ............. 359/337.4; 359/337.1; 359/341.41
(58) Field of Classification Search ............... 359/337.1, 359/337.4, 341.41
See application file for complete search history.

(56) References Cited

U.S. PATENT DOCUMENTS

| | | | |
|---|---|---|---|
| 6,411,429 B1 * | 6/2002 | Tomofuji et al. | 359/337 |
| 7,215,464 B1 * | 5/2007 | Komaki et al. | 359/341.44 |
| 2002/0060837 A1 * | 5/2002 | Inagaki et al. | 359/337 |
| 2003/0021009 A1 * | 1/2003 | MacCormack et al. | 359/337 |
| 2004/0197105 A1 * | 10/2004 | Khatana et al. | 398/173 |

FOREIGN PATENT DOCUMENTS

| | | |
|---|---|---|
| JP | 2004-6887 | 1/2004 |
| JP | 3551418 | 5/2004 |

* cited by examiner

*Primary Examiner*—Eric Bolda
(74) *Attorney, Agent, or Firm*—Staas & Halsey LLP

(57) ABSTRACT

An optical amplifier of the present invention comprises: first and second optical amplifying sections connected in series to each other between an input port and an output port; a first variable optical attenuator arranged on a former stage of the first optical amplifying section; a second variable optical attenuator arranged between the first and second optical amplifying sections; an optical amplification control section that controls the first and second optical amplifying sections; and an optical attenuation control section that controls the first and second variable optical attenuators. The optical amplification control section controls each of the optical amplifying sections so that a gain of the entirety of the optical amplifier is held constant, and the optical attenuation control section controls attenuation amounts of the variable optical attenuators so that monitor values of the output powers from the variable optical attenuators approximate the same value, provided that a value of the sum of the attenuation amounts of the variable optical attenuators decided according to the signal light input power per one wavelength of a WDM light is held constant. As a result, it becomes possible to provide at a low cost the optical amplifier capable of achieving flat output wavelength characteristics and the favorable NF, irrespective of the signal light input power per one wavelength of the WDM light and the number of wavelengths thereof.

7 Claims, 8 Drawing Sheets

CASE WHERE VOA CONTROL OF PRIOR INVENTION IS APPLIED
(NUMBER OF WAVELENGTHS: 2 WAVES)

OPTICAL AMPLIFIER

BACKGROUND OF THE INVENTION

1. Field of the Invention

The present invention relates to an optical amplifier for amplifying a wavelength division multiplexed (WDM) light containing a plurality of signal lights of different wavelengths, and in particular, to an optical amplifier provided with variable optical attenuators on inter-stages of a plurality of amplifying sections which are connected in series to each other.

2. Description of the Related Art

A demand for communications traffic is drastically increased with the development of multimedia networks, and a WDM transmission system for multi-repeatedly amplifying optical signals using optical amplifiers, has a large role for achieving the economization of communication system in the multimedia society.

A transmission loss assumed in the WDM transmission system is in a significantly wide range of about 0 to 30 dB. However, in the case where this transmission loss is compensated for by optical amplifiers of various types, there are caused problems of cost increases due to the stock of the various types of optical amplifiers, and the labor cost and time required in the selection of the optical amplifier types. Therefore, it is desired to compensate for the above transmission loss by the optical amplifiers of one type. If this desire is replaced with operating conditions of the optical amplifier, three performances, namely, the constant output power, flat gain wavelength characteristics and low noise figure (NF), to a broad input dynamic range, should be realized.

Further, the maximum number of wavelengths in the WDM transmission system is in wide range of, for example, 2 to 40 waves and so on, in response to the communication traffic volume. However, also in this case, in the same reason as the above, it is desired to cope with arbitrary number of wavelengths by optical amplifiers of one type. In such a case, in the optical amplifier, since a gain per one wavelength can be made large as the number of wavelengths is smaller, the favorable NF can be obtained as the number of wavelengths is smaller. As a result, in the WDM transmission system in which the maximum number of wavelengths is small, it becomes possible to achieve an increase of the number of repeating stages.

As a conventional technology for realizing the performances required for the optical amplifier used in the WDM transmission system as described above, there has been known, for example, a configuration in which a variable optical attenuator (VOA) which is seemingly contradictory to the amplification is arranged between a former stage amplifying section and a latter stage amplifying section in an optical amplifier of two staged configuration, and this configuration is a standard configuration of the optical amplifier in the WDM transmission system (refer to Japanese Patent No. 3551418).

Such a conventional optical amplifier applies a control method in which the total power of an input/output WDM light is monitored to thereby control a gain in each optical amplifying section to be constant, and also, an attenuation amount of the variable optical attenuator provided on an inter-stage of the amplifying sections is changed according to the fluctuation in a signal light input level, to thereby retain a predetermined signal light output level while maintaining the flatness of output wavelength characteristics.

However, in the conventional optical amplifier in which the variable optical attenuator is arranged on the inter-stage of the amplifying sections, since a control is performed for increasing the attenuation amount of the variable optical attenuator in response to an increase of the signal light input level, there is a problem in that the NF is abruptly degraded in a region where the signal light input level is high.

In order to solve the above problems, the applicant of the present invention has proposed a configuration in which, in addition to the inter-stage variable optical attenuator, variable optical attenuators are arranged on an output side of the latter stage amplifying section and further, on an input side of the former stage amplifying section, so that the respective amplifying sections are automatically gain controlled, and at the same time, the attenuation amount of each of the variable optical attenuators is interconnected controlled according to the signal light input level per one wavelength of the WDM light (refer to Japanese Patent Application No. 2005-252508).

To be specific, in the configuration in which the variable optical attenuators are arranged on the inter-stage of the former stage amplifying section and the latter stage amplifying section, and on the output side of the latter stage amplifying section, when the signal light input level per one wavelength of the WDM light is lower than a previously set base point level, the WDM light input to an input port is amplified by the former stage amplifying section which is automatically gain controlled, and thereafter, passes through the inter-stage variable optical attenuator of which attenuation amount is set at minimum, and is sent to the latter stage amplifying section which is automatically gain controlled to be amplified, and further, is attenuated by the output side variable optical attenuator of which attenuation amount is controlled according to the signal light input level, so that the WDM light of which signal light output level is controlled to be constant, is output from an output port. On the other hand, when the signal light input level is higher than the base point level, the WDM light amplified by the former stage amplifying section is attenuated by the inter-stage variable optical attenuator of which attenuation amount is controlled according to the signal light input level, and further, the WDM light amplified by the latter stage amplifying section is attenuated by the output side variable optical attenuator of which attenuation amount is controlled according to the signal light input level. As a result, since the attenuation amount required for the inter-stage variable optical attenuator is decreased with the application of the output side variable optical attenuator, it becomes possible to suppress the deterioration of the NF in the region where the signal light input level is high.

Incidentally, in the configuration in which the variable optical attenuator is also arranged on the input side of the former stage amplifying section, even in the case where the signal light input level exceeds a level capable to be coped with by the inter-stage and the output side variable optical attenuators, a further broad input dynamic range is realized, by attenuating to a constant level the power of the signal light fed to the former stage amplifying section by the input side variable optical attenuator.

However, in the optical amplifier proposed in the prior invention as described above, there is caused a problem in that, although the desired NF can be obtained in a state where the number of wavelengths of the WDM light is large (for example, 40 waves and so on), it is hard to obtain the desired NF in a state where the number of wavelengths of the WDM light is small (for example, 2 waves and so on). Namely, in the configuration of the prior invention, since the respective former stage amplifying section and the latter stage amplifying section are automatically gain controlled, gains of the respective amplifying sections are controlled to have the same value, irrespective of the number of wavelengths of the WDM light. Therefore, in the state of the small number of wavelengths, each amplifying section which has the performance capable of obtaining a required gain when the number of wavelengths of the WDM light is maximum, is operated without exerting the intrinsic performance thereof, and based on such an operating state of each amplifying section, a control target value of the attenuation amount of each of the inter-stage and output side variable optical attenuators is decided. Accordingly, in the case where not only the signal light input level per one wavelength of the WDM light but also an increase/decrease of the number of wavelengths is considered, there is room for improvement of the NF in the prior invention.

Further, as a separate problem from the NF, in the configuration in which the variable optical attenuator is arranged on the output side of the latter stage amplifying section, in order to realize a desired signal light output level, it is required to obtain a higher gain in the latter stage amplifying section. Thus, there is caused the necessity to apply a pumping light source of large power to the latter stage amplifying section, resulting in drawbacks of an increase of power consumption, the degradation in heat dissipation, the rise of manufacturing cost and the like.

SUMMARY OF THE INVENTION

The present invention has been accomplished in view of the above problems, and has an object to provide at a low cost an optical amplifier capable of obtaining flat output wavelength characteristics and the favorable NF, irrespective of a signal light input level per one wavelength of a WDM signal light and the number of wavelengths thereof.

In order to achieve the above object, according to the present invention, an optical amplifier for amplifying a wavelength division multiplexed light containing a plurality of signal lights of different wavelengths, comprises: an input port and an output port; first and second optical amplifying sections connected in series to each other between the input port and the output port; a first variable optical attenuator arranged between the input port and the first optical amplifying section; a second variable optical attenuator arranged between the first optical amplifying section and the second optical amplifying section; an optical amplification control section that monitors the power of the wavelength division multiplexed light input to the input port and the power of the wavelength division multiplexed light output from the output port, and controls the first and second optical amplifying sections so that a gain calculated based on monitoring results is held constant; and an optical attenuation control section that decides a value of the sum of attenuation amounts of the first and second variable optical attenuators according to the signal light input power per one wavelength of the wavelength division multiplexed light input to the input port, and also, monitors the signal light power of the wavelength division multiplexed light output from each of the first and second variable optical attenuators, and controls the attenuation amounts of the first and second variable optical attenuators, so that monitor values of the output powers from the first and second variable optical attenuators approximate the same value, while holding the decided value of the sum of the attenuation amounts constant.

According to the optical amplifier of such a configuration, the wavelength division multiplexed light input to the input port is attenuated by the first variable optical attenuator, and thereafter, is amplified by the first optical amplifying section, and further, is attenuated by the second variable optical attenuator, and thereafter, is amplified by the second optical amplifying section to be output from the output port. At this time, the first and second optical amplifying sections are controlled by the optical amplification control section so that a gain of the entirety of the present optical amplifier is held constant, and further, the attenuation amounts of the first and second variable optical attenuators are controlled by the optical attenuation control section so that the monitor values of the output powers from the respective variable optical attenuators approximate the same value, provided that the value of the sum of the attenuation amounts, which is decided according to the signal light input power per one wavelength of the wavelength division multiplexed light input to the input port, is held constant.

According to the optical amplifier of the present invention as described in the above, even in the case where the number of wavelengths of the wavelength division multiplexed light input to the input port is small, the wavelength division multiplexed light can be efficiently amplified in the respective optical amplifying sections, and also, influences by the respective variable optical attenuators on the NF can be suppressed at minimum. Thus, it becomes possible to obtain flat output wavelength characteristics and the favorable NF, irrespective of the signal light input level per one wavelength of the wavelength division multiplexed light and the number of wavelengths thereof. Further, since no variable optical attenuator is arranged between the second optical amplifying section and the output port, any pumping light source of large power is not loner required to be applied to the second optical amplifying section. As a result, the optical amplifier of low power consumption and excellent heat dissipation can be realized at a low cost.

Other objects, features and advantages of the present invention will become apparent from the following explanation of the embodiment, in conjunction with the appended drawings.

DESCRIPTION OF THE PREFERRED EMBODIMENTS

There will be described an embodiment for implementing the present invention, with reference to the accompanying drawings.

Figure 1:
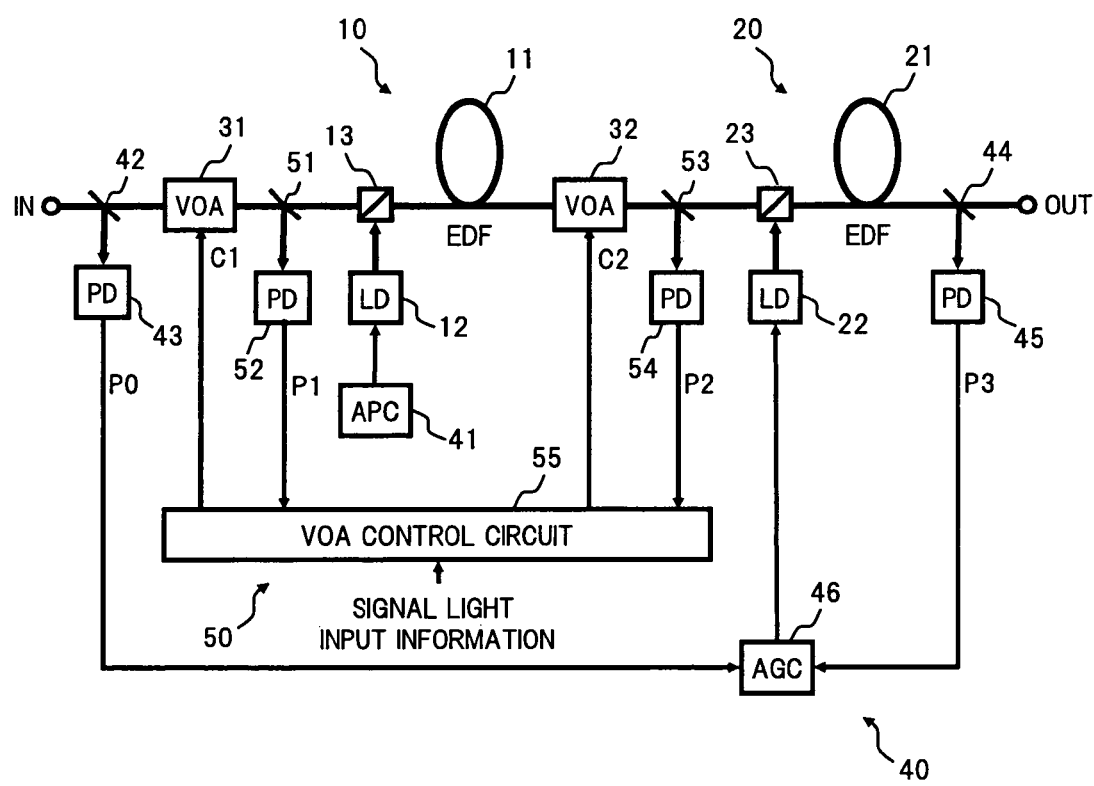
FIG. 1 is a block diagram showing a configuration of a WDM optical amplifier according to one embodiment of the present invention.

FIG. 1 is a block diagram showing a configuration of a WDM optical amplifier according to one embodiment of the present invention.

In FIG. 1, the present optical amplifier comprises, for example: a first optical amplifying section 10 and a second optical amplifying section 20, which are connected in serial to each other between an input port IN and an output port OUT; a first variable optical attenuator (VOA) 31 arranged between the input port IN and the first optical amplifying section 10; a second variable optical attenuator (VOA) 32 arranged on an inter-stage of the first and second optical amplifying sections 10 and 20; an optical amplification control section 40 that controls respective amplifying operations of the first and second optical amplifying sections 10 and 20; and an optical attenuation control section 50 that controls respective attenuation amounts of the first and second variable optical attenuators 31 and 32.

Each of the first and second optical amplifying sections 10 and 20 is a typical erbium-doped fiber amplifier (EDFA) which supplies a pumping light output from a pumping light source (LD) 12, 22 to an erbium-doped fiber (EDF) 11, 21 via a multiplexer 13, 23, to thereby collectively amplify a WDM light. In the first optical amplifying section 10, the pumping light source 12 is controlled in accordance with a control signal from an APC circuit 41 (to be described later) of the optical amplification control section 40, whereas in the second optical amplifying section 20, the pumping light source 22 is controlled in accordance with a control signal from an AGC circuit 46 (to be described later) of the optical amplification control section 40. The first and second optical amplifying sections 10 and 20 are automatically controlled by the optical amplification control section 40 so that a gain of the entirety of the present optical amplifier is held constant. Note, herein, there is shown one example in which the EDFA is used as each of the first and second optical amplifying section 10 and 20. However, the present invention is not limited thereto, and an optical fiber amplifier using a fiber doped with rare-earth element other than erbium as an amplifying medium, may be applied, and further, other than the rare-earth element doped fiber amplifier, it is also possible to apply a known optical amplifier capable of collectively amplifying the WDM light.

Each of the first and second variable optical attenuators 31 and 32 is a well-known optical device capable of changing an attenuation amount thereof, and the attenuation amount thereof is automatically controlled in accordance with a control signal C1, C2 output from a VOA control circuit 55 (to be described later) of the optical attenuation control section 50. Here, the attenuation amount of the first variable optical attenuator 31 is ATT1, and the attenuation amount of the second variable optical attenuator 32 is ATT2. Incidentally, as each of the variable optical attenuators 31 and 32, there may be used a typical variable optical attenuator of which attenuation amount does not have the wavelength dependence, or it is possible to use a variable optical attenuator (variable optical filter) having the wavelength dependence of the attenuation amount which negates the wavelength dependence of a gain of each optical amplifying section.

The optical amplification control section 40 includes, for example: the APC circuit 41; an optical branching coupler 42 and a photodetector (PD) 43, which serve as an input monitor; an optical branching coupler 44 and a photodetector (PD) 45, which serve as an output monitor; and the AGC circuit 46. The APC circuit 41 detects the power of the pumping light output from the pumping light source 12 of the first optical amplifying section 10 by a pumping light monitor (not shown in the figure), to perform an automatic power control (APC) on a driving state of the pumping light source 12, so that the detected power is held constant at a previously set level. The optical branching coupler 42 branches a part of the WDM light input to the input port IN, to send a branched light to the photodetector 43. The photodetector 43 receives the branched light from the optical branching coupler 42 to detect the power thereof, and outputs a signal P0 indicating the detection result to the AGC circuit 46. The optical branching coupler 44 branches a part of the WDM light output from the EDF 21 of the second optical amplifying section 20, to send a branched light to the photodetector 45. The photodetector 45 receives the branched light from the optical branching coupler 44 to detect the power thereof, and outputs a signal P3 indicating the detection result to the AGC circuit 46. The AGC circuit 46 calculates the gain of the entirety of the present optical amplifier based on the output signals P0 and P3 from the respective photodetectors 43 and 45, and performs an automatic gain control (AGC) on a driving condition of the pumping light source 22 of the second optical amplifying section 20.

The optical attenuation control section 50 includes, for example: optical branching couplers 51 and 53; photodetectors 52 and 54; and the VOA control circuit 55. The optical branching coupler 51 branches a part of the WDM light output from the first variable optical attenuator 31 to send a branched light to the photodetector 52. The photodetector 52 receives the branched light from the optical branching coupler 51 to detect the power thereof, and outputs a signal P1 indicating the detection result to the VOA control circuit 55. The optical branching coupler 53 branches a part of the WDM light output from the second variable optical attenuator 32 to send a branched light to the photodetector 54. The photodetector 54 receives the branched light from the optical branching coupler 53 to detect the power thereof, and outputs a signal P2 indicating the detection result to the VOA control circuit 55. The VOA circuit 55 obtains the signal light power of the WDM light output from each of the first and second variable optical attenuators 31 and 32, based on signal light input information given from the outside and the output signals P1 and P2 from the respective photodetectors 43 and 45, and controls the respective attenuation amounts ATT1 and ATT2, so that the output powers from the first and second variable attenuators 31 and 32 approximate the same level as much as possible.

Figure 2:
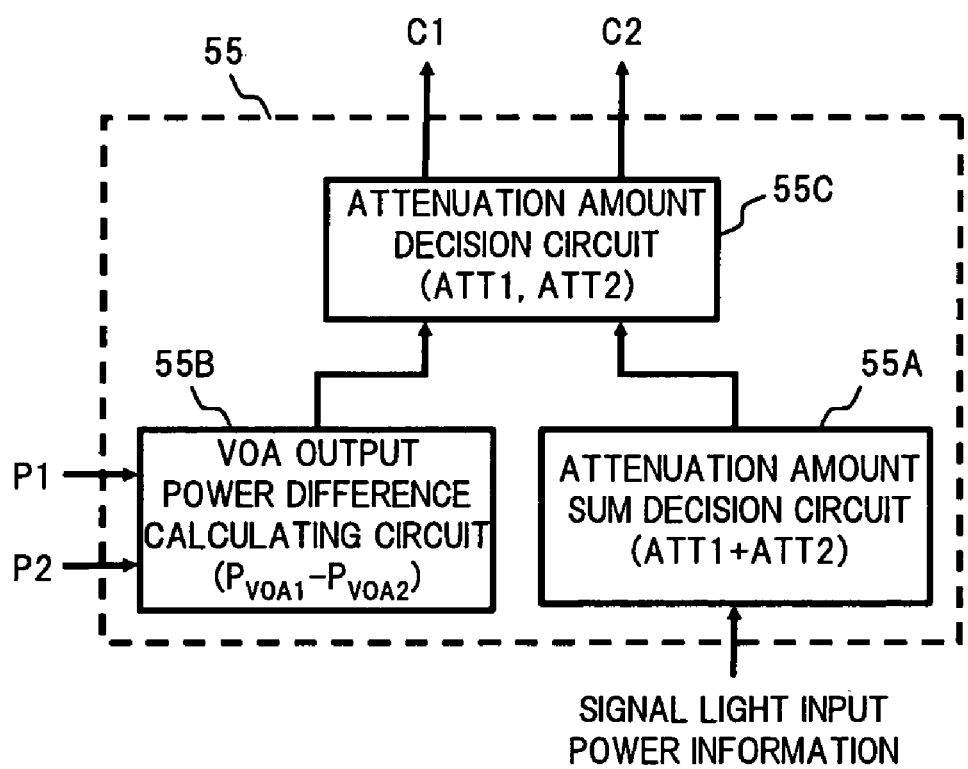
FIG. 2 is a block diagram showing one example of specific circuit configuration of a VOA control circuit in the embodiment.

FIG. 2 is a block diagram showing one example of specific circuit configuration of the VOA control circuit 55. In this configuration example, the VOA control circuit 55 comprises: an attenuation amount sum decision circuit 55A; a VOA output power difference calculating circuit 55B and an attenuation amount decision circuit 55C. The attenuation amount sum decision circuit 55A decides the sum (ATT1+ATT2) of the attenuation amounts of the first and second variable optical attenuators 31 and 32, based on signal light input power information given from the outside. To be specific, on the basis of a minimum value $P_{IN(MIN)}$ of the signal light input power per one wavelength of the WDM light which is capable to be input to the present optical amplifier, a difference of the signal light input power $P_{IN}$ per one wavelength of the actually input WDM light from the minimum value is obtained, to thereby decide a value of the difference which equals to the sum (ATT1+ATT2) of the attenuation amounts of the first and second variable optical attenuators 31 and 32, namely, to thereby decide the value of the sum of the attenuation amounts of the first and second variable optical attenuators 31 and 32 in accordance with a relation of the next formula (1).

$$ATT1+ATT2=P_{IN}-P_{IN(MIN)} \quad (1)$$

The VOA output power difference calculating circuit 55B obtains the signal light powers $P_{VOA1}$ and $P_{VOA2}$ of the WDM light, which are respectively output from the first and second variable optical attenuators 31 and 32, based on the output signals P1 and P2 respectively output from the photodetectors 43 and 45, to calculate a difference ($P_{VOA1}-P_{VOA2}$) between the signal light powers. The attenuation amount decision circuit 55C decides values of the attenuation amounts ATT1 and ATT2 of the variable optical attenuators 31 and 32, which are capable to minimize an absolute value of the difference ($P_{VOA1}-P_{VOA2}$) between the output powers from the variable optical attenuators 31 and 32 calculated in the VOA output power difference calculating circuit 55B, provided that the sum (ATT1+ATT2) of the attenuation amounts of the variable optical attenuators 31 and 32 decided in the attenuation amount sum decision circuit 55A is held constant, and then, outputs the control signals C1 and C2 respectively indicating the decided attenuation amounts ATT1 and ATT2 to the variable optical attenuators 31 and 32.

Next, there will be described an operation of the present embodiment.

In the optical amplifier of the above configuration, information relating to the number of wavelengths of the WDM light input to the input port IN and the signal light input power per one wavelength thereof, is previously given to the VOA control circuit 55, by utilizing a supervisory control signal or the like for a WDM transmission system. In the VOA control circuit 55 which received this information, in the attenuation amount sum decision circuit 55A, the sum (ATT1+ATT2) of the attenuation amounts of the variable optical attenuators 31 and 32 is decided in accordance with the above formula (1), according to the signal light input power per one wavelength of the WDM light input to the input port IN, and the decision result is transmitted to the attenuation amount decision circuit 55C. In the attenuation amount decision circuit 55C, initial values of the attenuation amounts ATT1 and ATT2 of the variable optical attenuators 31 and 32 are decided corresponding to the sum (ATT1+ATT2) of the attenuation amounts from the attenuation amount sum decision circuit 55A, and the control signals C1 and C2 respectively indicating the initial values are output to the variable optical attenuators 31 and 32. Note, the initial values of the attenuation amounts ATT1 and ATT2 corresponding to the sum (ATT1+ATT2) of the attenuation amounts are previously stored in the attenuation amount decision circuit 55C. Further, the pumping light sources 12 and 22 of the first and second optical amplifying sections 10 and 20 are also driven in previously set initial states, and the pumping lights output from the pumping light sources 12 and 22 are respectively supplied to the EDFs 11 and 12 via the multiplexers 13 and 23.

When the WDM light is input to the input port IN of the optical amplifier which is in the above described initial state, the input WDM light is fed to the first variable optical attenuator 31 after a part thereof is branched by the optical branching coupler 42, and further, is fed to the first optical amplifying section 10 performing the APC operation, after a part of the WDM light output from the first variable optical attenuator 31 is branched by the optical branching coupler 51. The WDM light which has been propagated through the EDF 11 of the first optical amplifying section 10 to be amplified is fed to the second variable optical attenuator 32, and further, is fed to the second optical amplifying section 20 performing the AGC operation, after a part of the WDM light output from the variable optical attenuator 32 is branched by the optical branching coupler 53. The WDM light which has been propagated through the EDF 21 of the second optical amplifying section 20 to be amplified is output from the output port OUT to the outside, after a part thereof is branched by the optical branching coupler 44.

In a series of processing of the WDM light by the variable optical attenuators 31 and 32, and the optical amplifying sections 10 and 20 as described in the above, the gain of the entirety of the present optical amplifier is automatically controlled to be constant, irrespective of changes of the number of wavelengths of the WDM light input to the input port IN and the signal light input power per one wavelength thereof. To be specific, in the present embodiment, the pumping light power output from the pumping light source 12 is controlled to be constant, so that the WDM light is most efficiently amplified in the first optical amplifying section 10, irrespective of an input state of the WDM light. Thus, even in the case where the number of wavelengths of the WDM light is small, for example, 2 waves, the WDM light is amplified by maximally utilizing the performance of the first optical amplifying section 10. To the APC operation of the first optical amplifying section 10, the second optical amplifying section 20 performs the AGC operation, since the driving state of the pumping light source 22 is controlled in accordance with the control signal from the AGC circuit 46. To be specific, in the AGC circuit 46, the gain of the entirety of the present optical amplifier is calculated, based on the output signals P0 and P3 from the photodetectors 43 and 45, indicating the powers of the parts of the WDM light respectively branched by the input end optical branching coupler 42 and the output end optical branching coupler 45, and a signal for controlling the driving state of the pumping light source 22 is generated so that the above gain is held constant at a previously set target value, and the generated control signal is output to the pumping light source 22. Thus, even if the number of wavelengths of the WDM light input to the input port IN and the signal light input power per one wavelength thereof are changed, the wavelength dependence of the signal light power of each wavelength output from the output port OUT is suppressed, so that flat output wavelength characteristics are maintained.

Simultaneously with the controls of the optical amplifying sections 10 and 20, the attenuation amounts of the variable optical attenuators 31 and 32 are respectively controlled in accordance with the control signals C1 and C2 output from the optical attenuation control section 50. In the control operation by the optical attenuation control section 50 on each of the variable optical attenuators 31 and 32, on condition that the formula (1) is materialized for the sum (ATT1+ATT2) of the attenuation amounts of the variable optical attenuators 31 and 32, the attenuation amounts ATT1 and ATT2 of the variable optical attenuators 31 and 32 are optimized, so that the signal powers output from the variable optical attenuators 31 and 32 approximate the same level as much as possible, to be specific, so that the absolute value of the difference ($P_{VOA1}-P_{VOA2}$) between the output powers from the variable optical attenuators 31 and 32 calculated in the VOA output power difference calculating circuit 55B is minimized.

The reason why the above formula (1) should be materialized in the control operation by the optical attenuation control section 50 on each the variable optical attenuators 31 and 32 is for obtaining the flat output wavelength characteristics. Further, the reason why the output powers from the variable optical attenuators 31 and 32 are made to approximate the same level as much as possible is for suppressing influences by the variable optical attenuators 31 and 32 on the noise figure (NF) of the present optical amplifier to a minimum. Namely, the NF of the present optical amplifier can be represented by the following formula (2), and it is understood from this relational expression that the lower one in the output level $P_{VOA1}$ of the variable optical attenuator 31 and the output level $P_{VOA2}$ of the variable optical attenuator 32 is a dominant factor. Therefore, in order to obtain the favorable NF, it becomes important to approximate to 0 the output level difference between the variable optical attenuators 31 and 32.

$$NF = 10 \cdot \log \left( 10^{\frac{P_{IN}-P_{VOA1}}{10}} \cdot 10^{\frac{NF_{10}}{10}} + 10^{\frac{P_{IN}-P_{VOA2}}{10}} \cdot 10^{\frac{NF_{20}}{10}} \right) \quad (2)$$

Here, there will be described in detail specific examples of the control operation by the optical attenuation control section 50 on each of the variable optical attenuators 31 and 32, separately for the case where the number of wavelengths of the WDM light is 40 waves, and for the case where the number of wavelengths of the WDM light is 2 waves. Note, in the following description, as a range of the signal light input power per one wavelength of the WDM light input to the present optical amplifier (input dynamic range), it is supposed that a lower limit thereof is −30 dBm/ch and an upper limit thereof is 0 dBm/ch. Further, the signal light input power per one wavelength of the WDM light output from the present optical amplifier is held constant at +3 dBm/ch.

Figure 3:
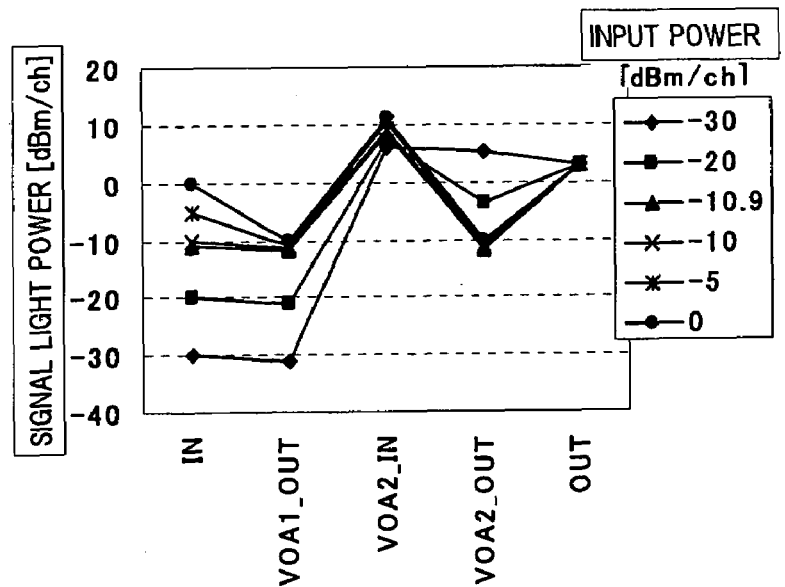
FIG. 3 is a graph showing a level diagram and a VOA output power difference in the case where the number of wavelengths is 40 waves in the embodiment.
Figure 3:
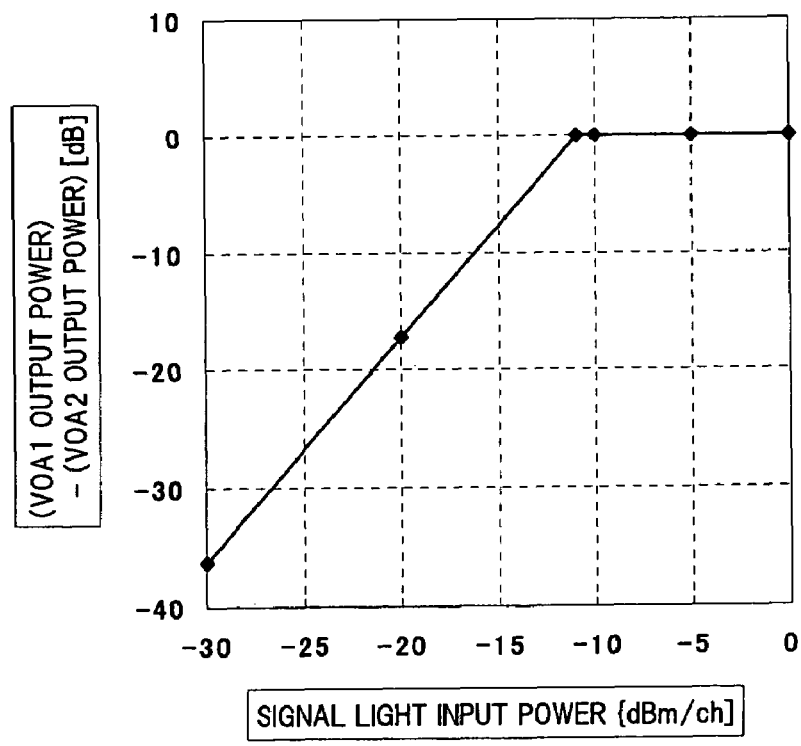

Firstly, there will be described the control operation for the case where the number of wavelengths of the WDM light is 40 waves, with reference to FIG. 3 and FIG. 4.

When the signal light input power per one wavelength of the WDM light is at the lower limit of −30 dBm/ch, in the attenuation amount sum decision circuit 55A, the sum (ATT1+ATT2) of the attenuation amounts of the variable optical attenuators 31 and 32 is decided at 0 dB in accordance with the above formula (1), and the decision result is transmitted to the attenuation amount decision circuit 55C, so that 0 dB (except for an insertion loss) is decided as the initial value of each of the attenuation amounts ATT1 and ATT2 of the variable optical attenuators 31 and 32. In such an initial state, as shown in a level diagram on an upper stage of FIG. 3, the WDM light input to the input port IN is amplified at a high gain in the first optical amplifying section 10 after slightly attenuated by the insertion loss (for example, about 1 dB) in the first variable optical attenuator 31, further, is amplified in the second optical amplifying section 20, after slightly attenuated by the insertion loss in the second variable optical attenuator 32, and then, is output from the output port OUT. Note, the amplification operation of the WDM light in the second optical amplifying section 20 is performed at a negative gain (attenuation), in the case where the first optical amplifying section 10 is operated at the high gain exceeding the target gain in the AGC.

At this time, the difference ($P_{VOA1}-P_{VOA2}$) between the output powers from the variable optical attenuators 31 and 32 calculated by the VOA output power difference calculating circuit 55B is a large absolute value corresponding to the gain of the first optical amplifying section 10, and this value is transmitted to the attenuation amount decision circuit 55C. In the attenuation amount decision circuit 55C, the optimization of the attenuation amounts ATT1 and ATT2 of the variable optical attenuators 31 and 32 is achieved, so that the absolute value of ($P_{VOA1}-P_{VOA2}$) is reduced as less as possible. However, here, it is necessary to maintain ATT1+ATT2=0 dB, and therefore, as shown in an upper stage of FIG. 4, the attenuation amounts ATT1 and ATT2 of the variable optical attenuators 31 and 32 are made to be still 0 dB. The NF of the present optical amplifier in such a control state is about 4 dB as shown in a lower stage of FIG. 4. Note, herein, the wavelength of each of the pumping light sources 12 and 22 is 0.98 μm, the output power of the pumping light source 12 which performs the APC operation is 100 mW, the conversion efficiency in each of the optical amplifying sections 10 and 20 is 60%, and each of the $NF_{10}$ and the $NF_{20}$ is 3.0 dB.

Figure 4:
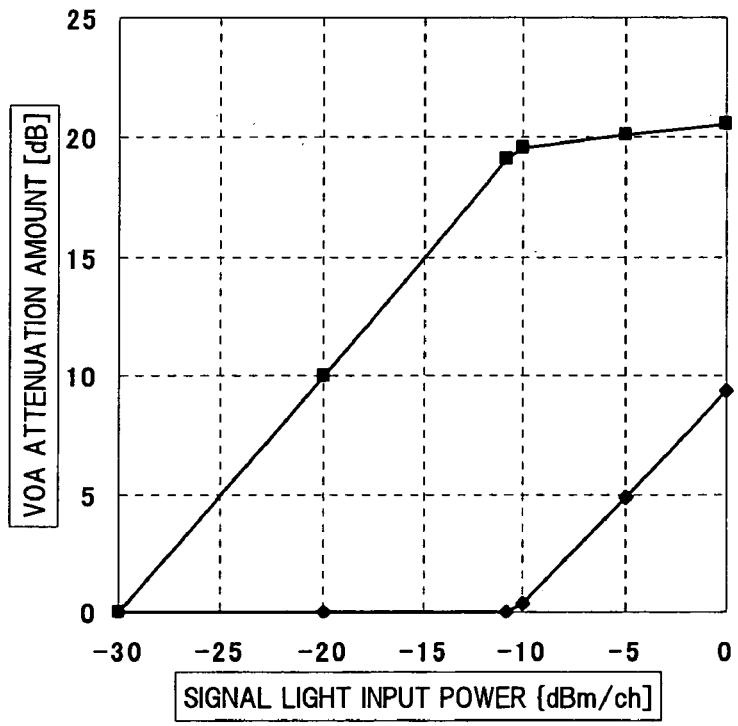
FIG. 4 is a graph showing a VOA attenuation amount and the NF in the case where the number of wavelengths is 40 waves in the embodiment.
Figure 4:
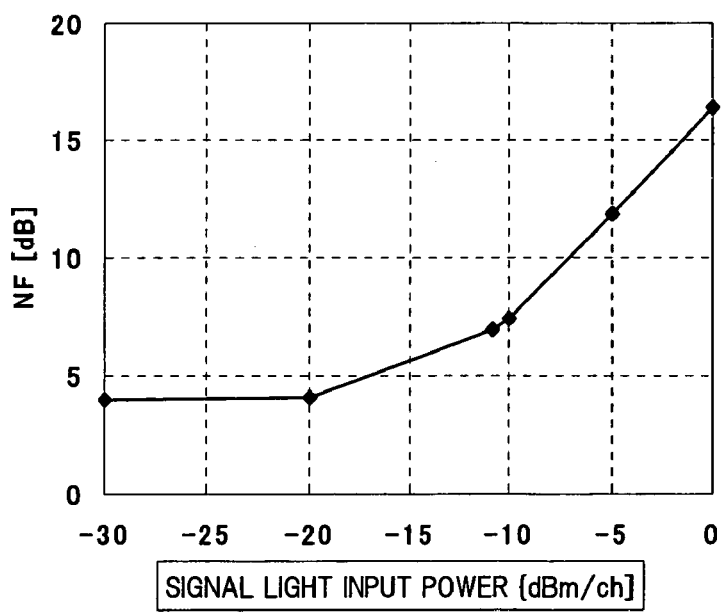

When the signal light input power per one wavelength of the WDM light is increased to −20 dBm/ch, the sum (ATT1+ATT2) of the attenuation amounts of the variable optical attenuators 31 and 32 is decided at 10 dB, and the attenuation amount ATT1 of the variable optical attenuator 31 is optimized to 0 dB and the attenuation amount ATT2 of the variable optical attenuator 32 is optimized to 10 dB (the upper stage of FIG. 4). As a result, the absolute value of the difference ($P_{VOA1}-P_{VOA2}$) between the output powers from the variable optical attenuators 31 and 32 is reduced to about 17 dB (the lower stage of FIG. 3). The NF of the present optical amplifier obtained in this state is about 4.1 dB which is substantially same as that in the case of −30 dBm/ch (the lower stage of FIG. 4).

When the signal light input power per one wavelength of the WDM light is further increased to −10 dBm/ch, the sum (ATT1+ATT2) of the attenuation amounts of the variable optical attenuators 31 and 32 is decided at 20 dB, and the attenuation amount ATT1 of the variable optical attenuator 31 is optimized to 0.4 dB and the attenuation amount ATT2 of the variable optical attenuator 32 is optimized to 19.6 dB (the upper stage of FIG. 4). As a result, the absolute value of the difference ($P_{VOA1}-P_{VOA2}$) between the output powers from the variable optical attenuators 31 and 32, reaches approximately zero (the lower stage of FIG. 3). Namely, the output levels of the variable optical attenuators 31 and 32 reach the substantially same level (the upper stage of FIG. 3). The NF of the present optical amplifier obtained in this state is about 7.4 dB (the lower stage of FIG. 4).

When the signal light input power per one wavelength of the WDM light reaches the upper limit of −0 dBm/ch, the sum (ATT1+ATT2) of the attenuation amounts of the variable optical attenuators 31 and 32 is decided at 30 dB, and the attenuation amount ATT1 of the variable optical attenuator 31 is optimized to 9.4 dB and the attenuation amount ATT2 of the variable optical attenuator 32 is optimized to 20.6 dB (the upper stage of FIG. 4). As a result, the output levels of the variable optical attenuators 31 and 32 reach the substantially same level (the upper stage of FIG. 3). The NF of the present optical amplifier obtained in this state is about 16.4 dB (the lower stage of FIG. 4).

Characteristics of the NF obtained in the case where the number of wavelengths of the WDM light is 40 waves as described in the above is similar to characteristics of the NF obtained in the case where, in the optical amplifier proposed in the already described prior invention (Japanese Patent Application No. 2005-252508), the former and latter stage optical amplifying sections are controlled by the AGC for the entirety of the optical amplifier as in the present embodiment, and not controlled by the independent AGC. Namely, when the number of wavelengths of the WDM light is large, an improvement effect of the NF, by applying the above described control of the variable optical attenuators 31 and 32 which is one of features of the present invention, is not so great. The improvement effect of the NF becomes remarkable when the number of wavelengths of the WDM light is small as described later.

Figure 5:
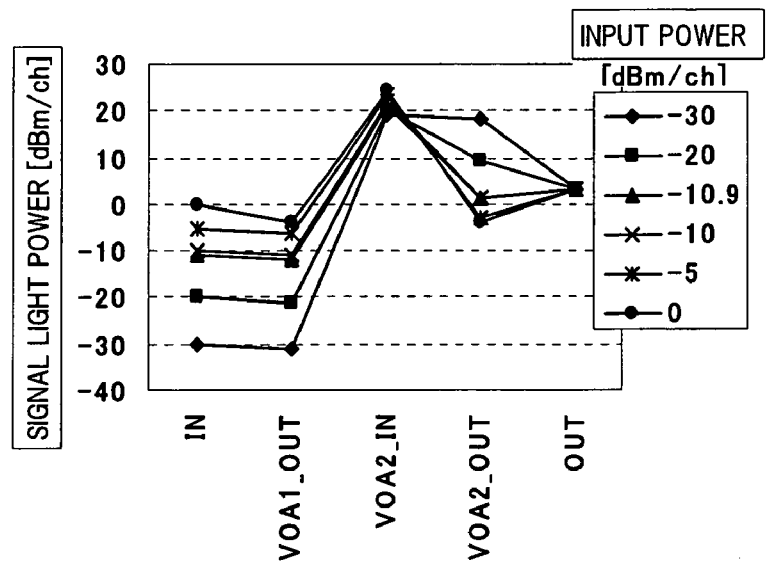
FIG. 5 is a graph showing the level diagram and the VOA output power difference in the case where the number of wavelengths is 2 waves in the embodiment.
Figure 5:
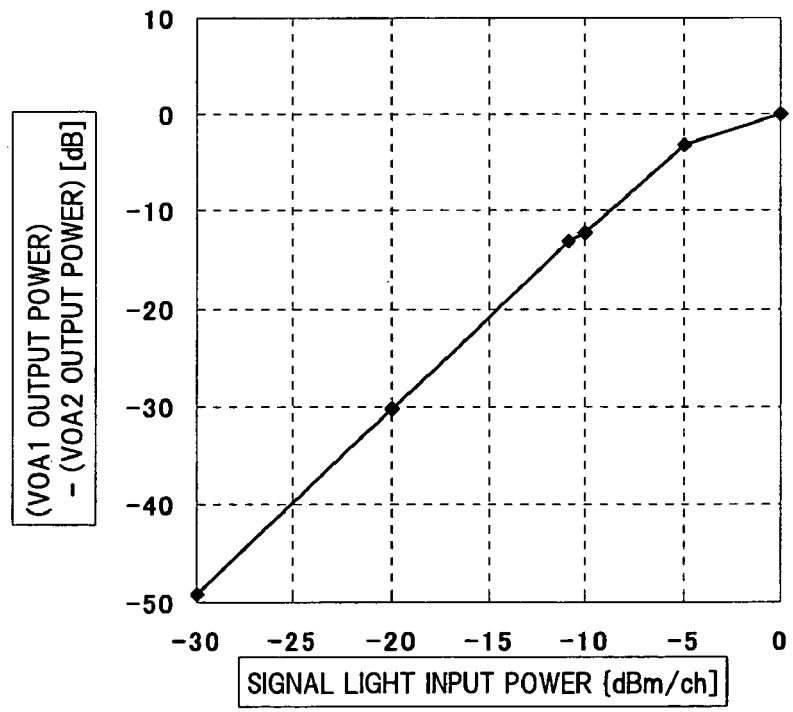
Figure 7:
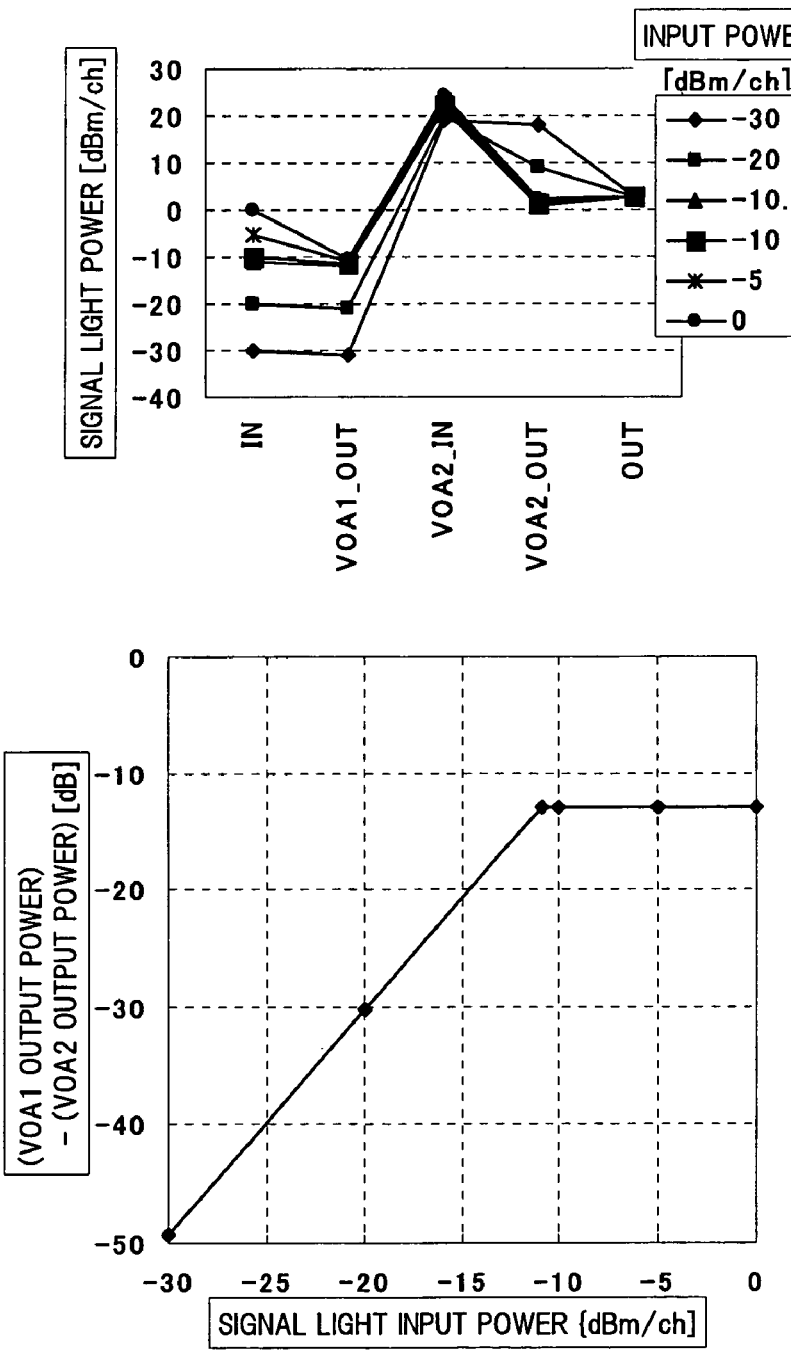
FIG. 7 is a graph showing the level diagram and the VOA output power difference in the case where the number of wavelengths is 2 waves in an optical amplifier to which a VOA of the prior invention is applied.
Figure 8:
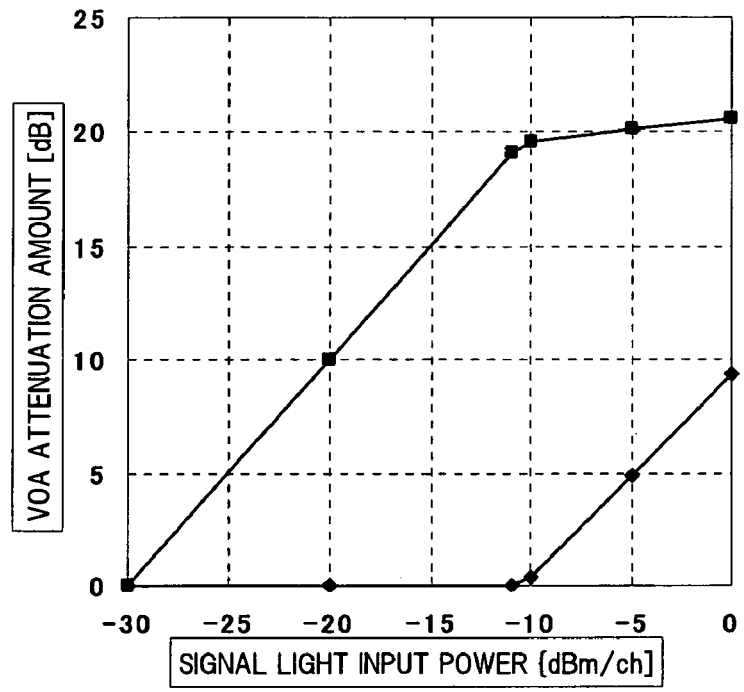
FIG. 8 is a graph showing the VOA attenuation amount and the NF in the case where the number of wavelengths is 2 waves in the optical amplifier to which the VOA of the prior invention is applied.
Figure 8:
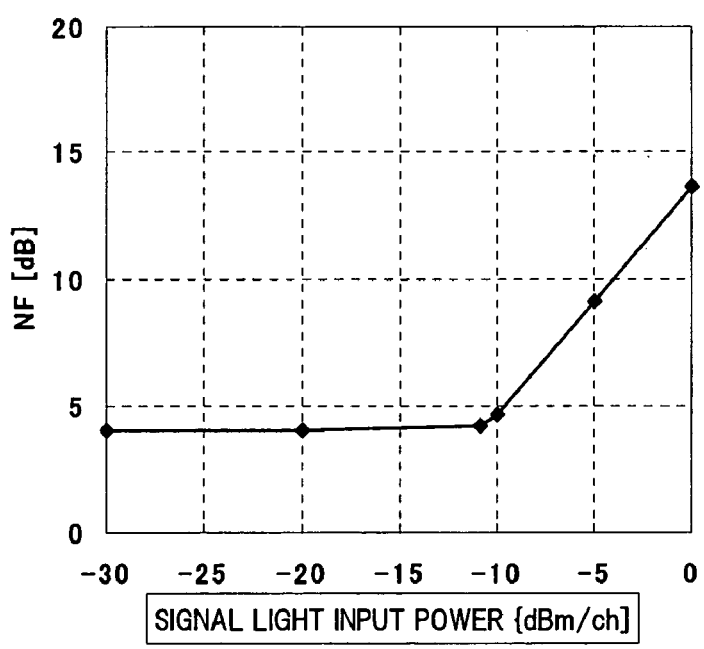

Next, there will be described the control operation for the case where the number of wavelengths of the WDM light is 2 waves, with reference to FIG. 5 and FIG. 6. Incidentally, in order to compare the optical amplifier in the prior invention with the present embodiment, there are shown, in FIG. 7 and FIG. 8, respective graphs corresponding to those in FIG. 5 and FIG. 6, for the case where the control of the former and latter stage optical amplifying sections are modified to the AGC for the entirety of the optical amplifier, and the control of the variable optical attenuator in each stage is conventionally performed without the modification (to be referred hereunder as the case where the VOA control in the prior invention is applied).

When the signal light input power per one wavelength of the WDM light is at the lower limit of −30 dBm/ch, in the present optical amplifier, similarly to the case of 40 waves, the sum (ATT1+ATT2) of the attenuation amounts of the variable optical attenuators 31 and 32 is decided at 0 dB, and the attenuation amounts ATT1 and ATT2 of the variable optical attenuators 31 and 32 are decided at 0 dB (except for the insertion loss). As shown in a level diagram on an upper stage of FIG. 5, the WDM light input to the input port IN is amplified at the high gain in the first optical amplifying section 10 after slightly attenuated by the insertion loss in the first variable optical attenuator 31, and further, is amplified in the second optical amplifying section 20 (here, attenuated due to the negative gain) after slightly attenuated by the insertion loss in the second variable optical attenuator 32, and then, is output from the output port OUT. The NF of the present optical amplifier in such a control state is about 4 dB as shown in a lower stage of FIG. 6.

Here, comparing the NF obtained in the present optical amplifier when the signal light input power is −30 dBm/ch (the lower stage of FIG. 6) with the NF obtained when the VOA control in the prior invention is applied (a lower stage of FIG. 8), a significant difference is not yet caused between them under the input condition of −30 dBm/ch.

Figure 6:
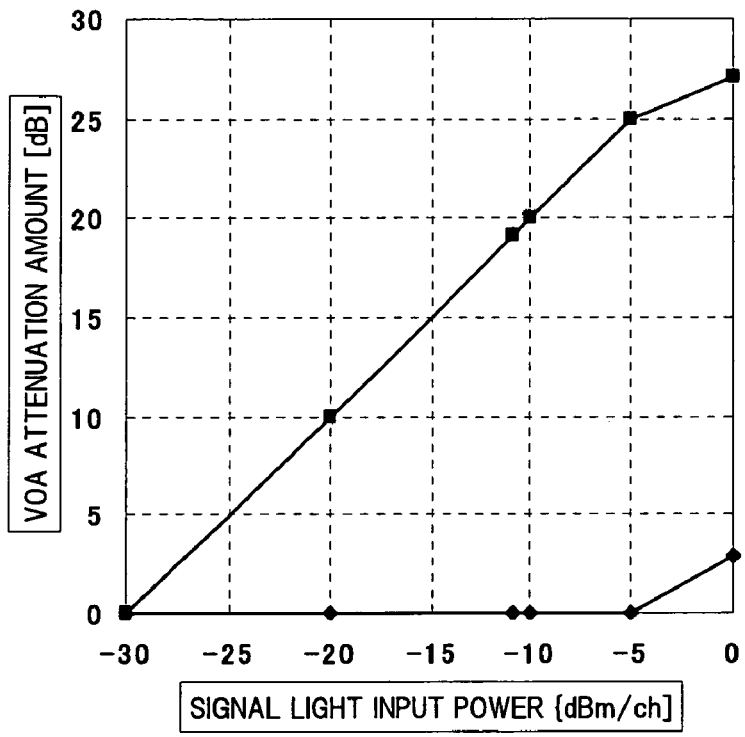
FIG. 6 is a graph showing the VOA attenuation amount and the NF in the case where the number of wavelengths is 2 waves in the embodiment.
Figure 6:
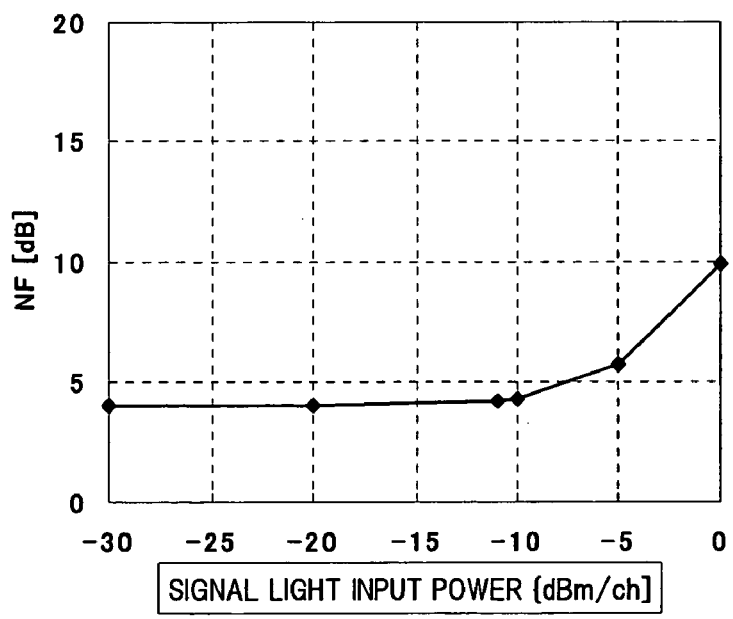

When the signal light input power per one wavelength of the WDM light is increased to −10 dBm/ch, the sum (ATT1+ATT2) of the attenuation amounts of the variable optical attenuators 31 and 32 is decided at 20 dB, and the attenuation amount ATT1 of the variable optical attenuator 31 is optimized to 0 dB and the attenuation amount ATT2 of the variable optical attenuator 32 is optimized to 20 dB (the upper stage of FIG. 6). As a result, the absolute value of the difference ($P_{VOA1}-P_{VOA2}$) between the output powers from the variable optical attenuators 31 and 32 is reduced to about 12 dB (the lower stage of FIG. 5). The NF of the present optical amplifier obtained in this state is about 4.3 dB. On the other hand, in the case where the VOA control in the prior invention is applied, the NF obtained when the signal light input power is −10 dBm/ch, is about 4.6 dB (the lower stage of FIG. 8). Accordingly, by applying the VOA control in the present invention, the NF improvement effect of about 0.3 dB can be obtained.

When the signal light input power per one wavelength of the WDM light is further increased to −5 dBm/ch, the sum (ATT1+ATT2) of the attenuation amounts of the variable optical attenuators 31 and 32 is decided at 25 dB, and the attenuation amount ATT1 of the variable optical attenuator 31 is optimized to 0 dB and the attenuation amount ATT2 of the variable optical attenuator 32 is optimized to 25 dB (the upper stage of FIG. 6). As a result, the absolute value of the difference ($P_{VOA1}-P_{VOA2}$) between the output powers from the variable optical attenuators 31 and 32, is reduced to about 3 dB (the lower stage of FIG. 5). The NF of the present optical amplifier obtained in this state is about 5.7 dB (the lower stage of FIG. 6). On the other hand, in the case where the VOA control in the prior invention is applied, the NF obtained when the signal light input power is −5 dBm/ch, is about 9.1 dB (the lower stage of FIG. 8). Accordingly, by applying the VOA control in the present invention, the NF improvement effect of about 3.4 dB can be obtained.

When the signal light input power per one wavelength of the WDM light reaches the upper limit of −0.0 dBm/ch, the sum (ATT1+ATT2) of the attenuation amounts of the variable optical attenuators 31 and 32 is decided at 30 dB, and the attenuation amount ATT1 of the variable optical attenuator 31 is optimized to 2.9 dB and the attenuation amount ATT2 of the variable optical attenuator 32 is optimized to 27.1 dB (the upper stage of FIG. 6). As a result, the absolute value of the difference ($P_{VOA1}-P_{VOA2}$) between the output powers from the variable optical attenuators 31 and 32, reaches approximately zero (the lower stage of FIG. 5). Namely, the output levels of the variable optical attenuators 31 and 32 reach the substantially same level (the upper stage of FIG. 5). The NF of the present optical amplifier obtained in this state is about 9.9 dB (the lower stage of FIG. 6). On the other hand, in the case where the VOA control in the prior invention is applied, the NF obtained when the signal light input power is −0 dBm/ch, is about 13.6 dB (the lower stage of FIG. 8). Accordingly, by applying the VOA control in the present invention, the NF improvement effect of about 3.7 dB can be obtained.

As described in the above, according to the present optical amplifier, the NF improvement effect becomes remarkable, in the case where the number of wavelengths of the WDM light is small and also the signal light input power per one wavelength is equal to or higher than −10 dBm/ch. Therefore, it becomes possible to obtain the flat wavelength characteristics and the favorable NF, irrespective of the signal light input level per one wavelength of the WDM light and the number of wavelengths thereof. Further, differently from the configuration of the prior invention, since no variable optical attenuator is arranged between the optical amplifying section 20 and the output port OUT, any pumping light of large power is no longer required to be applied to the second optical amplifying section 20, and accordingly, it becomes possible to realize at a low cost the optical amplifier of low power consumption and excellent heat dissipation.

Incidentally, in the above embodiment, there has been shown the configuration example in which the first optical amplifying section 10 is operated by the APC and the second optical amplifying section 20 is operated by the AGC, so that the gain of the entirety of the optical amplifier is controlled to be constant. However, the present invention is not limited thereto, and the configuration may be such that the pumping light power for the first optical amplifying section 10 and the pumping light power for the second optical amplifying section 20 are controlled in accordance with a previously set ratio (for example, 3:1 or the like) according to the gain calculated based on the monitoring results of the input monitor and the output monitor, so that the gain of the entirety of the optical amplifier is controlled to be constant.

Further, in the above embodiment, there has been described the optical amplifier of two-staged configuration in which the variable optical attenuators are arranged on the input stage and the inter-stages. However, it is also possible to apply the present invention to an optical amplifier of three or more-staged configuration, similarly to the present embodiment. For example, in the case of the optical amplifier of three-staged configuration provided with first to third variable optical attenuators, the first to third variable optical attenuators are arranged, respectively, on the input stage, on the inter-stage of the first and second optical amplifying sections, and on the inter-stage of the second and third optical amplifying sections, and the optical amplification control section controls the gain of the entirety of the optical amplifier to be constant, and further, the optical attenuation control section optimizes the attenuation amount of each variable optical attenuator, so that the output powers from the respective variable optical attenuators approximate the same level as much as possible, provided that the sum of the attenuation amounts of the first to third variable optical attenuators is held constant at the value according to the signal light input power.

What is claimed is:

1. An optical amplifier for amplifying a wavelength division multiplexed light containing a plurality of signal lights of different wavelengths, comprising;
    an input port and an output port;
    first and second optical amplifying sections connected in series to each other between said input port and said output port;
    a first variable optical attenuator arranged between said input port and said first optical amplifying section;
    a second variable optical attenuator arranged between said first optical amplifying section and said second optical amplifying section;
    an optical amplification control section that monitors the power of the wavelength division multiplexed light input to said input port and the power of the wavelength division multiplexed light output from said output port, and controls said first and second optical amplifying sections so that a gain calculated based on monitoring results is held constant; and
    an optical attenuation control section that decides a value of the sum of attenuation amounts of said first and second variable optical attenuators according to the signal light input power per one wavelength of the wavelength division multiplexed light input to said input port, and also, monitors the signal light power of the wavelength division multiplexed light output from each of said first and second variable optical attenuators, and controls the attenuation amounts of said first and second variable optical attenuators, so that monitor values of the output powers from said first and second variable optical attenuators approximate the same value, while holding the decided value of the sum of the attenuation amounts constant.

2. An optical amplifier according to claim 1,
    wherein said first and second optical amplifying sections each comprises: a rare-earth element doped fiber; a pumping light source which generates a pumping light for pumping said rare-earth element doped fiber; and a multiplexer which multiplexes the pumping light output from said pumping light source and the wavelength division multiplexed light, to supply a multiplexed light to said rare-earth element doped fiber.

3. An optical amplifier according to claim 2,
    wherein said optical amplification control section comprises: an input monitor which monitors the power of the wavelength division multiplexed light input to said input port; an output monitor which monitors the power of the wavelength division multiplexed light output from said output port; an APC circuit which, for said first optical amplifying section, controls said pumping light source so that the power of the pumping light supplied to said rare-earth element doped fiber is held constant; and an AGO circuit which, for said second optical amplifying section, controls said pumping light source so that the gain calculated based on the monitoring results of said input monitor and said output monitor is held constant.

4. An optical amplifier according to claim 2,
    wherein said optical amplification control section comprises: an input monitor which monitors the power of the wavelength division multiplexed light input to said input port; an output monitor which monitors the power of the wavelength division multiplexed light output from said output port; and an AGO circuit which controls the pumping light power for said first optical amplifying section and the pumping light power for said second optical amplifying section in accordance with a previously set ratio, so that the gain calculated based on the monitoring results of said input monitor and said output monitor is held constant.

5. An optical amplifier according to claim 1,
    wherein said optical attenuation control section comprises: a variable optical attenuator output power monitor which monitors the signal light power of the wavelength division multiplexed light output from each of said first and second variable optical attenuators; an attenuation amount sum decision circuit which is fed with the signal light input power per one wavelength of the wavelength division multiplexed light input to said input port, and decides a value of the sum of the attenuation amounts of said first and second variable optical attenuators based on said information; a variable optical attenuator output power difference calculating circuit which calculates a difference between the output powers from said first and second variable optical attenuators based on a monitoring result by said variable optical attenuator output power monitor; and an attenuation amount decision circuit which decides the attenuation amounts of said first and second variable optical attenuators, at which an absolute value of the difference calculated by said variable optical attenuator output power difference calculating circuit can mostly approximate zero, while holding the value of the sum of the attenuation amounts decided by said attenuation amount sum decision circuit, and outputs control signals for controlling said first and second variable optical attenuators in accordance with the decided attenuation amounts.

6. An optical amplifier according to claim 1, further comprising:
    a third optical amplifying section connected between said second optical amplifying section and said output port; and
    a third variable optical attenuator arranged between said second and third optical amplifying section,
    wherein said optical amplification control section controls said first to third optical amplifying section so that a gain calculated based on said monitoring results is held constant, and
    said optical attenuation control section decides a value of the sum of attenuation amounts of said first to third variable optical attenuators according to the signal light input power per one wavelength of the wavelength division multiplexed light input to said input port, and also, monitors the signal light power of the wavelength division multiplexed light output from each of said first to third variable optical attenuators, and controls the attenuation amounts of said first to third variable optical attenuators, so that monitor values of the output powers from said first to third variable optical attenuators approximate the same value, while holding the decided value of the sum of the attenuation amounts constant.

7. An optical amplifier according to claim 6, wherein said third optical amplifying section and said third variable optical attenuator are made to be one unit, and a plurality of said units are multistage connected between said second optical amplifying section and said output port.

* * * * *

UNITED STATES PATENT AND TRADEMARK OFFICE
CERTIFICATE OF CORRECTION

| | |
|---|---|
| PATENT NO. | : 7,643,206 B2 |
| APPLICATION NO. | : 11/598098 |
| DATED | : January 5, 2010 |
| INVENTOR(S) | : Tomoaki Takeyama et al. |

Page 1 of 1

It is certified that error appears in the above-identified patent and that said Letters Patent is hereby corrected as shown below:

Column 13, Line 20, change "comprising;" to --comprising:--.

Column 14, Line 3, change "AGO" to --AGC--.

Column 14, Line 13, change "AGO" to --AGC--.

Signed and Sealed this

Thirtieth Day of March, 2010

David J. Kappos
*Director of the United States Patent and Trademark Office*